United States Patent

Watanabe et al.

[15] 3,688,266

[45] Aug. 29, 1972

[54] PREPROCESSING SYSTEM FOR PATTERN RECOGNITION

[72] Inventors: Sadakazu Watanabe, Tokyo; Kenichi Mori, Yokohama; Tsuneo Yoneyama, Kawasaki; Hiroshi Genchi, Tokyo, all of Japan

[73] Assignee: Tokyo Shibaura Electric Co., Ltd., Kawasaki-shi, Japan

[22] Filed: March 30, 1970

[21] Appl. No.: 23,944

[30] Foreign Application Priority Data

March 31, 1969 Japan ......................44/24171

[52] U.S. Cl...................340/146.3 MA, 340/146.3 H
[51] Int. Cl..............................................G06k 9/12
[58] Field of Search...................................340/146.3

[56] References Cited

UNITED STATES PATENTS

| | | | |
|---|---|---|---|
| 3,234,513 | 2/1966 | Brust | 340/146.3 |
| 3,104,372 | 9/1963 | Rabinow et al. | 340/146.3 |
| 3,541,508 | 11/1970 | Vaccaro | 340/146.3 |
| 3,196,398 | 7/1965 | Baskin | 340/146.3 |

*Primary Examiner*—Maynard R. Wilbur
*Assistant Examiner*—Leo H. Boudreau
*Attorney*—Kemon, Palmer & Estabrook

[57] ABSTRACT

A preprocessing system for pattern recognition comprising a photoelectric conversion scanner for generating video signals corresponding to an original pattern consisting of characters recorded on a surface of a recorded carrier so as to be read out, a first quantizer for carrying out quantization at a first threshold voltage level of video signals from said scanner such that the signal representing a character may contain omitted portions, but does not include any substantial readout signal component corresponding to stains present in spaces of said record carrier other than those occupied by said character, a second quantizer for carrying out quantization at a second threshold level of video signals from said scanner such that the signal representing the character does not contain any substantial omissions, but may include readout signal components corresponding to stains present in spaces of said record carrier other than those occupied by said character and a circuit arrangement for substantially completing the omitted portions included in the quantized output from said first quantizer utilizing the quantized outputs from both first and second quantizers and substantially eliminating information corresponding to stains present in the other blank spaces of said record carrier than those occupied by said character.

2 Claims, 20 Drawing Figures

INVENTORS
Sadakazu Watanabe
Kenichi Mori
Tsuneo Yoneyama
Hiroshi Kondo
By [illegible]
Attorneys INVENTORS
Sadakazu Watanabe
Kenichi Mori
Tsuneo Yoneyama
Hiroshi Tokoro
By Kemon, Palmer & Estabrook
Attorneys INVENTORS
Sadakazu Watanabe
Kenichi Mori
Tsuneo Yoneyama
Hiroshi Genchi
By Lemon Palmer & Estabrook
Attorneys INVENTORS
Sadakazu Watanabe
Kenichi Mori
Tsuneo Yoneyama
Hiroshi Genchi INVENTORS
Sadakazu Watanabe
Kenichi Mori
Tsuneo Yoneyama
Hiroshi Genchi
By Kemon, Palmer & Estabrook
Attorneys

INVENTORS

INVENTORS

INVENTORS

Sadakazu Watanabe

Attorneys

INVENTORS

INVENTORS

Attorneys

INVENTORS
Sadakazu Watanabe
Kenichi Mori
Tsuneo Yoneyama
Hiroshi Genchi
By Kemon, Palmer & Estabrook
Attorneys

INVENTORS

INVENTORS
Sadakazu Watanabe
Kenichi Mori
Tsuneo Yoneyama
Hiroshi Genchi
By Wenderoth, Lind & Ponack
Attorneys INVENTORS
Sadakazu Watanabe
Kimeaki Mori
Isuneo Genyoma
Hiroshi Genchi
By Kenyon, Palmer & Estabrook
Attorneys

INVENTORS

By Kemon, Palmer & Estabrook
Attorneys

PREPROCESSING SYSTEM FOR PATTERN RECOGNITION

The present invention relates to a preprocessing device for reading patterns. The inventors are proceeding with the development of a pattern reader to be used, for example, as an automatic postal code number reader-sorter or an input device in an electronic computer system. They have discovered that almost all letter patterns including not only hand-written letters but also those printed by hand or machine such as a typewriter or a printer contain, as microscopically observed, more or less fine cuts or thinned out portions due to unsatisfactory impression of types, uneven application of printing ink, defects of writing implements or irregularities on the surface of a record carrier, for example, a sheet of paper on which letters are written or printed.

In the case of an envelope which indicates letters to be read out such as a postal code number, even though said letters may not contain the aforesaid cuts or thinned out portions, the envelope is not always of a white color, but particularly in business customarily assumes a brown or blue color. Moreover, there are used considerable numbers of envelopes of which the brown color falls outside of the range specified by the regulations for mail matter, thus causing the outlines of letters indicated on the front envelope surface to stand out in indistinct contrast with the portions of said surface other than those occupied by said letters.

Letters of such poor contrast are likely to cause portions of the patterns corresponding to the most poorly contrasted portions of said letters to be readily lost when they are processed in a photoelectric conversion device for changing letter patterns into electrical signals or subsequent quantizer. Therefore such letters are read out substantially in the form bearing many cuts or thinned out portions as in the aforementioned case. Accordingly, there is a great need to develop a pattern reading system which is capable of reading out even defective original letter patterns as distinctly as possible.

Pattern reading systems of this kind heretofore put into practical use include the type where the photoelectric conversion section is operated at a variable threshold voltage level to distinguish between the letter portions and other blank spaces of a record carrier. Namely, there is normally formed at a certain threshold voltage level a quantized pattern consisting of letters to be read out, namely, the "1" and "0" rows of a binary logic. Where, however, the letters to be read out poorly contrast with other blank spaces, said threshold voltage level is reduced. Conversely where the contrast is high, said threshold voltage level is raised. Where a numeral 8 indicated by type printing techniques illustrated, for example, in FIG. 1 is read out by the aforesaid pattern reading system, there is generally obtained a quantized pattern such as shown in FIG. 2A. The right upper shoulder section and central intersecting section of said numeral 8 shown in FIG. 1 stand out in indistinct contrast with other blank areas, so that the corresponding sections of a quantized pattern illustrated in FIG. 2A present omitted portions. Depending on circumstances, therefore, such event most likely leads to the occurrence of erroneous reading. It will be apparent that if the threshold voltage level for quantization is increased over that at which said pattern is obtained there will, undesirably, appear many more cuts. If, in reading out the aforesaid FIG. 8, the threshold voltage level for quantization is decreased from that associated with FIG. 2A in order to reduce or eliminate omissions appearing in those parts of the FIG. 8 which bear a low contrast with other blank spaces, then as shown in FIG. 2B such cuts will decrease, as compared with, than in the case of FIG. 2A. If the threshold voltage level is still further reduced, then the FIG. 8 will be presented in a form substantially free from omissions as shown in FIG. 2C. However, if the threshold voltage level for quantization is decreased as described above so as to minimize omissions present in the body of characters, then there will occur other difficulties in reading out the characters, because there will be increasingly generated noise signals resulting from stains other than normal characters which often appear on the letter-indicating surface of a record carrier. Accordingly, a pattern reading system using such a variable threshold voltage level has a substantial tendency to give rise to erroneous reading.

Another type of known pattern reading system compares information on the density at a given point of a character body with information on the density at another given point in its immediate neighborhood and judges whether this neighboring point should be considered to constitute part of a character body by determining whether the difference between the densities at the two points exceeds or falls below a determined threshold voltage level, thereby filling up the aforementioned omitted or thinned out portions appearing in a character body. However, where a character body contains thinned out portions, this type of pattern reading system judges those portions of the character body which present the greatest difference of densities, or are most thinned out to be entirely omitted. Or where stains happen to have a higher density than that of a readable character body, such a pattern reading system deems such stains to represent part of the character itself. In either case, therefore, this pattern reader also has a fairly large possibility of committing erroneous reading.

The present invention has been accomplished in view of a preprocessing system for pattern recognition comprising a photoelectric conversion scanner for generating video signals corresponding to an original pattern consisting of characters recorded on a surface of a record carrier so as to be read out; a first quantizer for carrying out quantization at a first threshold voltage level of video signals from said scanner such that the signal representing a character may contain omitted portions, but does not include any substantial readout signal component corresponding to stains present in spaces of said record carrier other than those occupies by said characters; a second quantizer for carrying out quantization at a second threshold voltage level of video signals from said scanner such that the signal representing the character does not contain any substantial omissions, but may include readout signal components corresponding to stains present in spaces of said record carrier other than those occupied by said character and a circuit arrangement for substantially completing the omitted portions included in the quantized output from said first quantizer utilizing the quantized outputs from both first and second quantizers and substantially eliminating information corresponding to stains present in the other blank spaces of said record carrier than those occupied by said character.

This invention can be more fully understood from the following detailed description when taken in connection with reference to the accompanying drawings, in which.

Figures 1, 15:
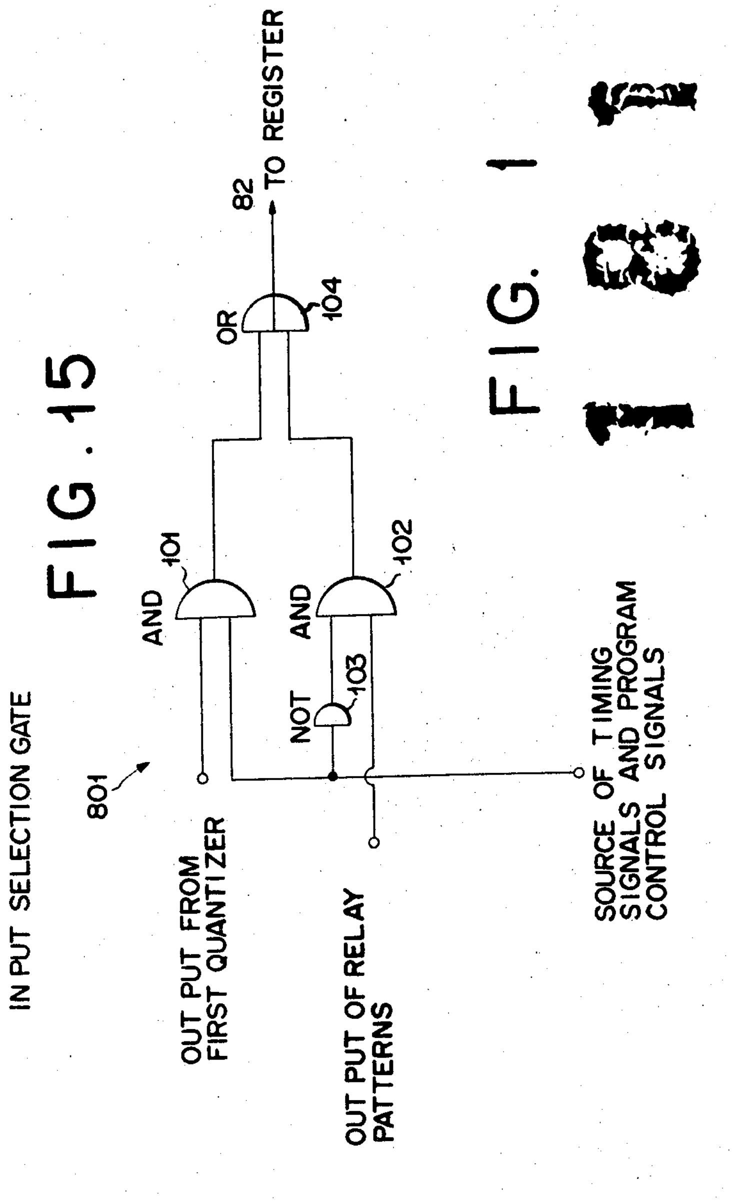
FIG. 1 illustrates an original character pattern to be read out.
Figure 2A:
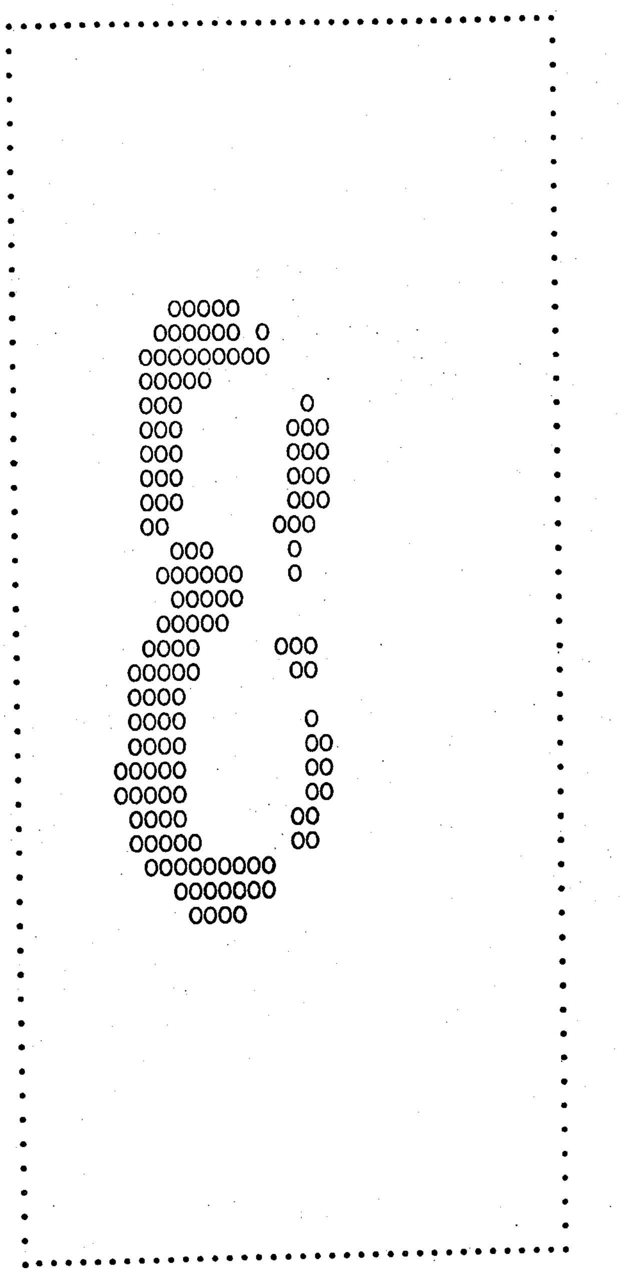
FIGS. 2A to 2C represent quantized patterns of said original character pattern of FIG. 1 where it is quantized at different threshold voltage levels using a prior art pattern reader.
Figure 5A:
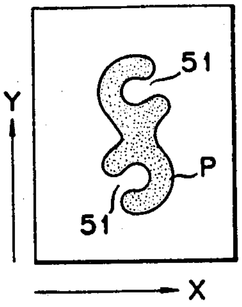
Figure 5B:
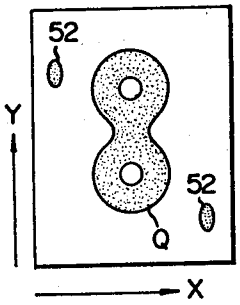
Figure 2B:
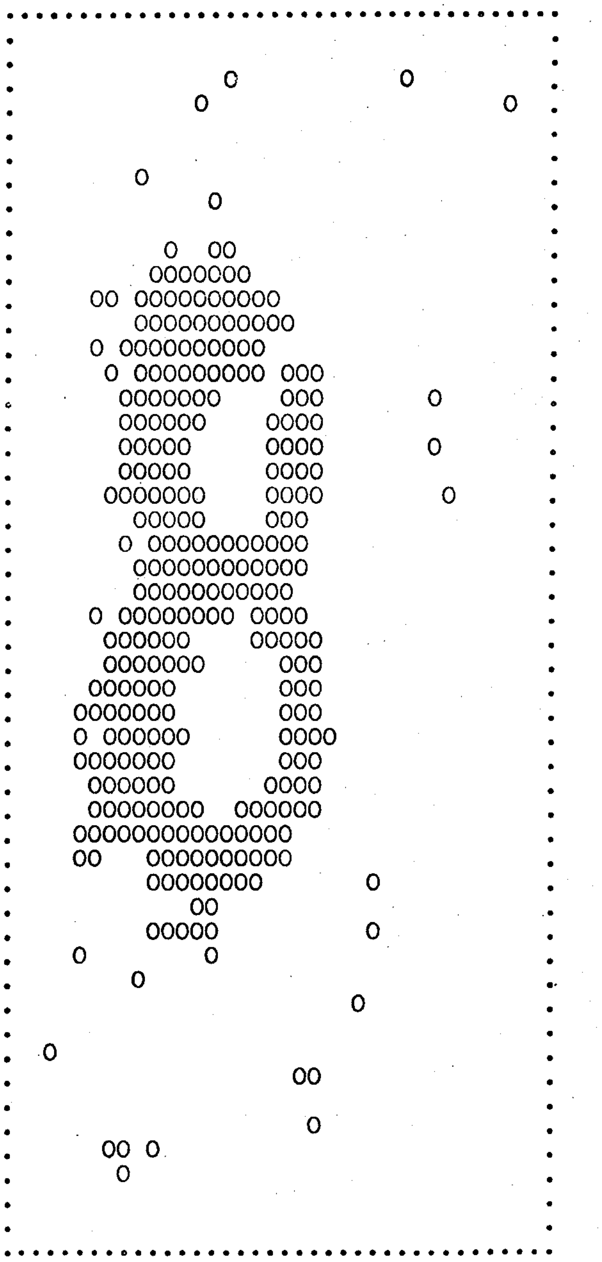
Figure 2C:
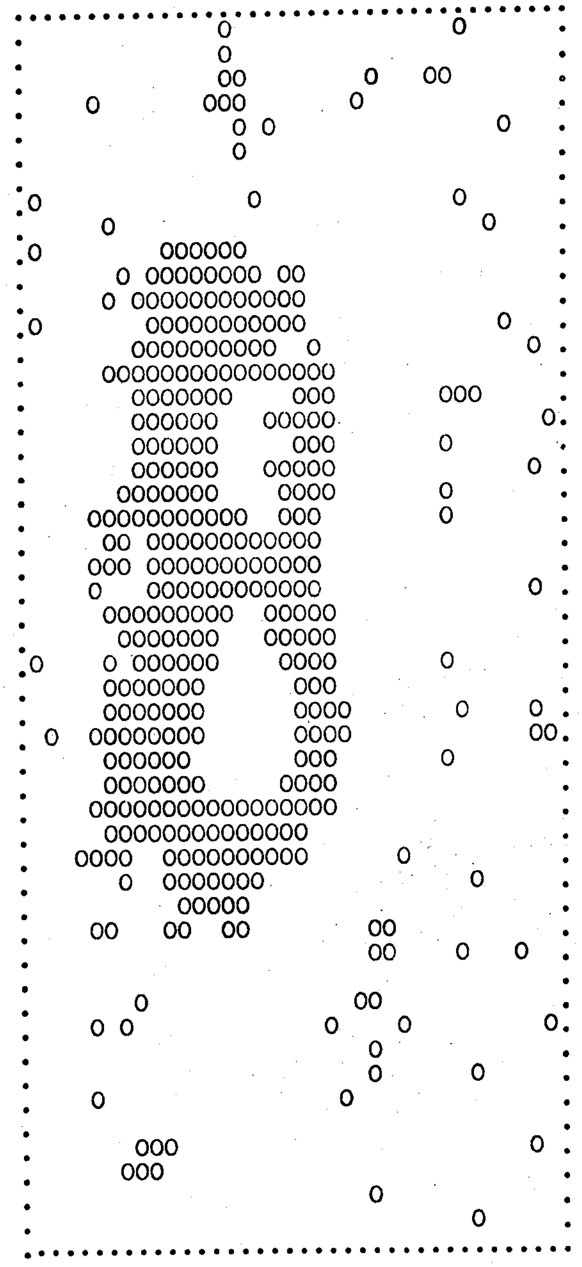
Figures 3, 4A, 4B:
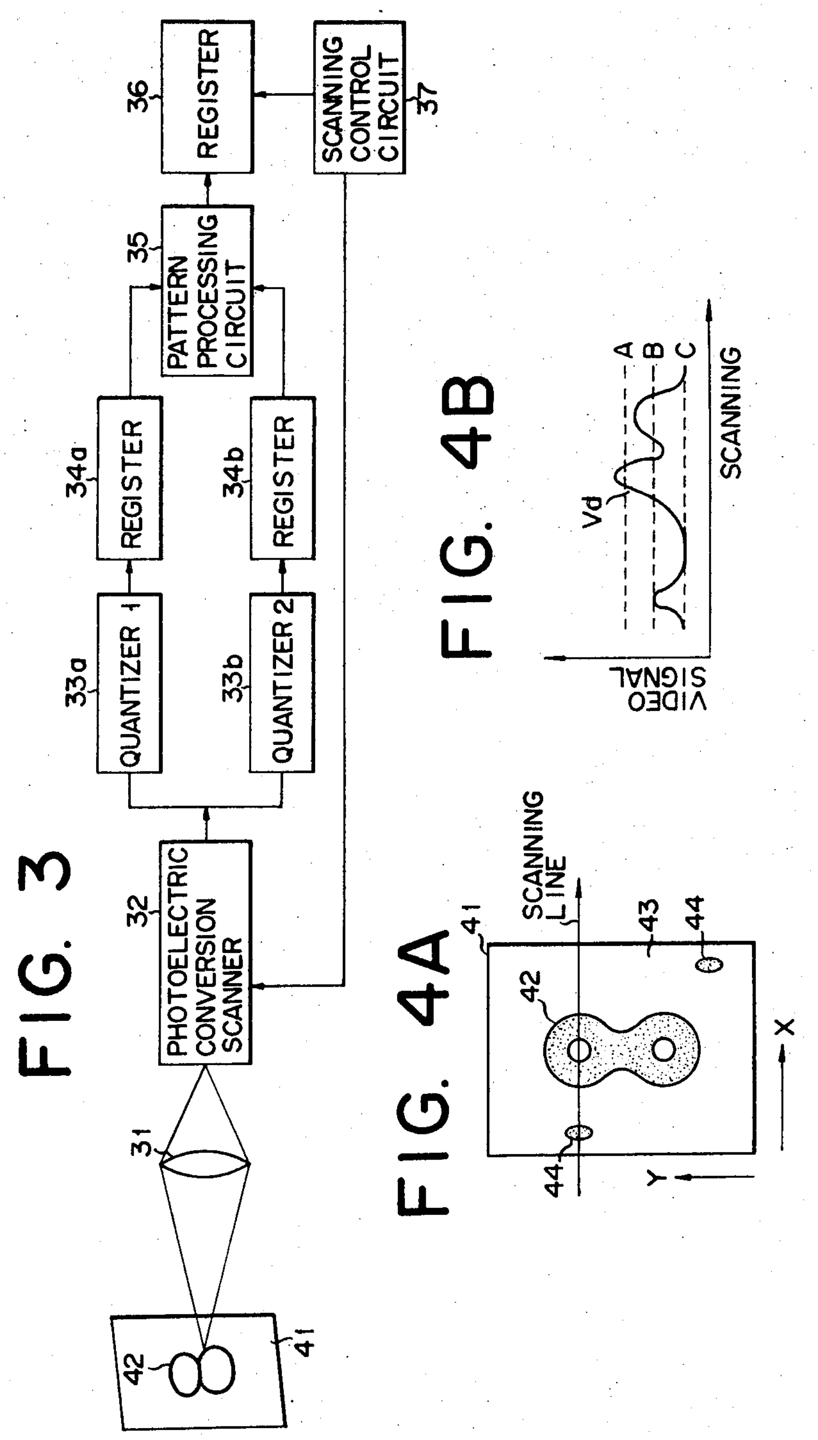
FIG. 3 is a schematic block diagram of a preprocessing device for reading patterns according to an embodiment of the present invention.
FIG. 4A shows a recorded original character pattern to be read out by the embodiment of FIG. 3.
Figure 6:
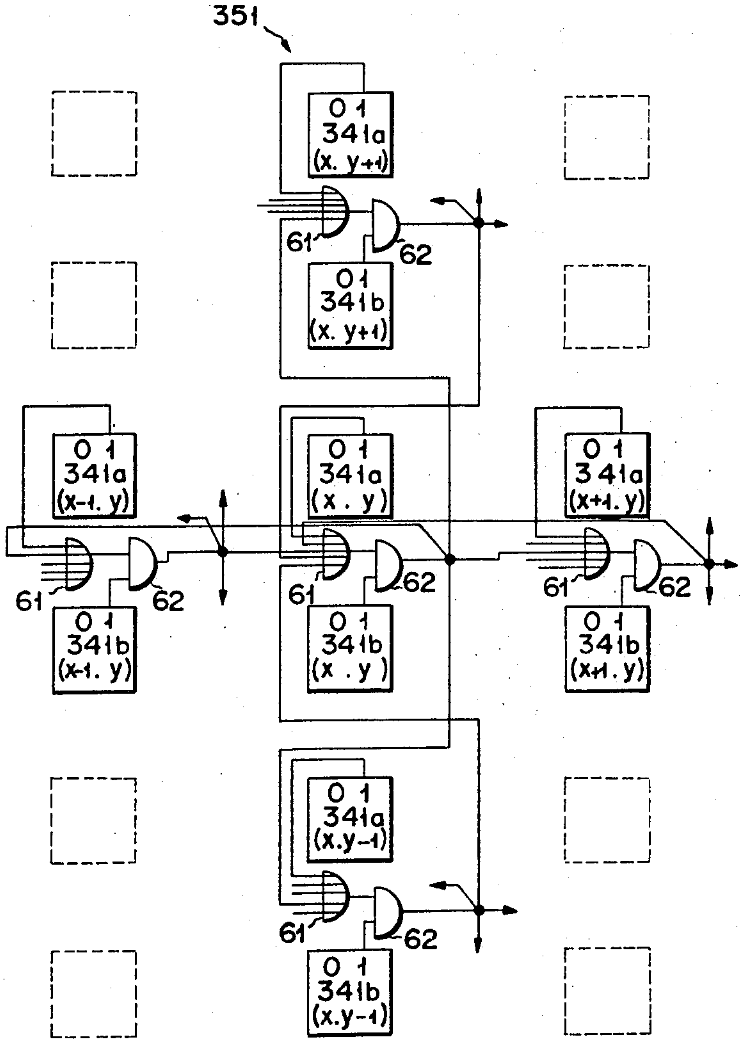
Figure 7:
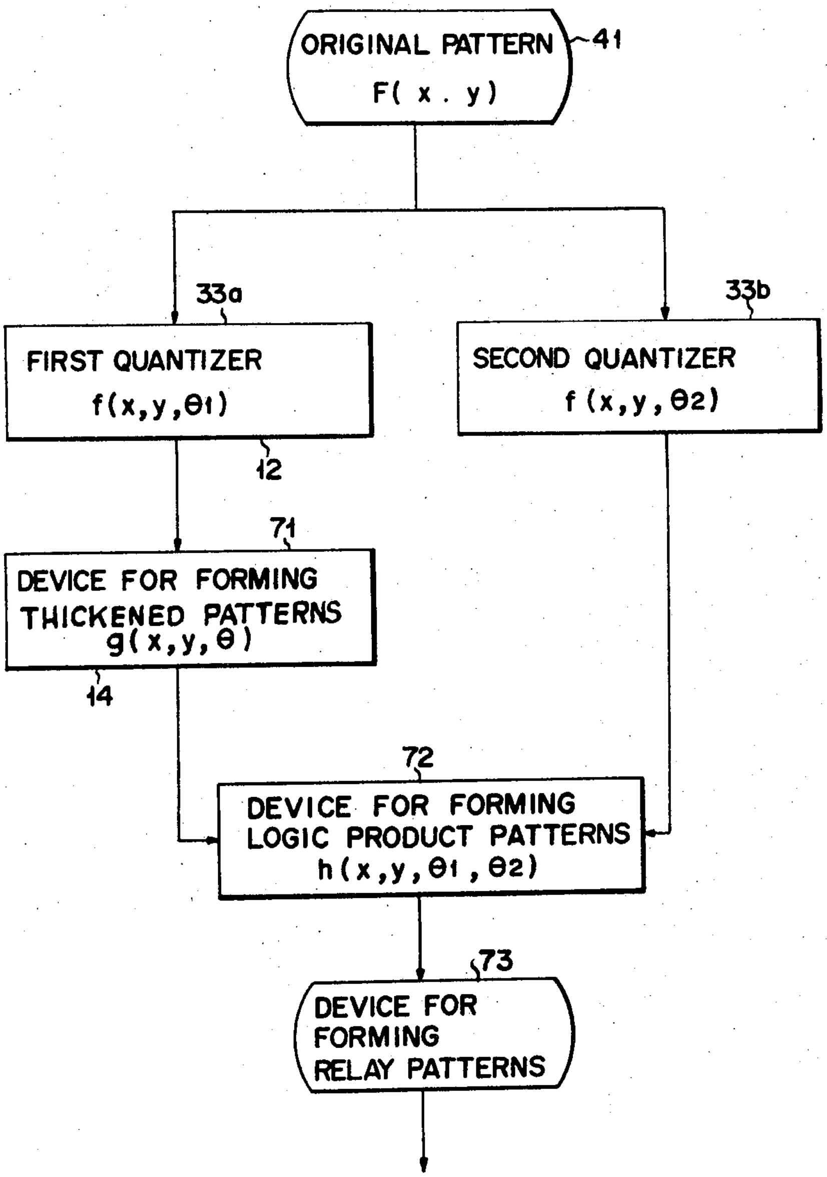
Figure 8:
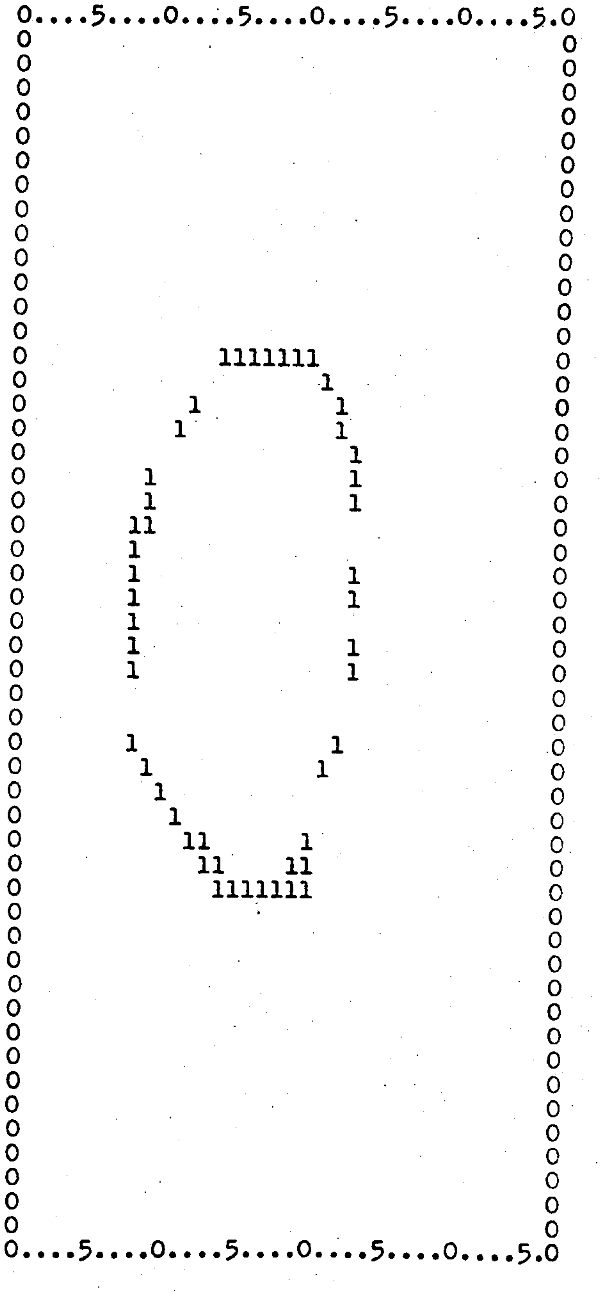
Figure 9:
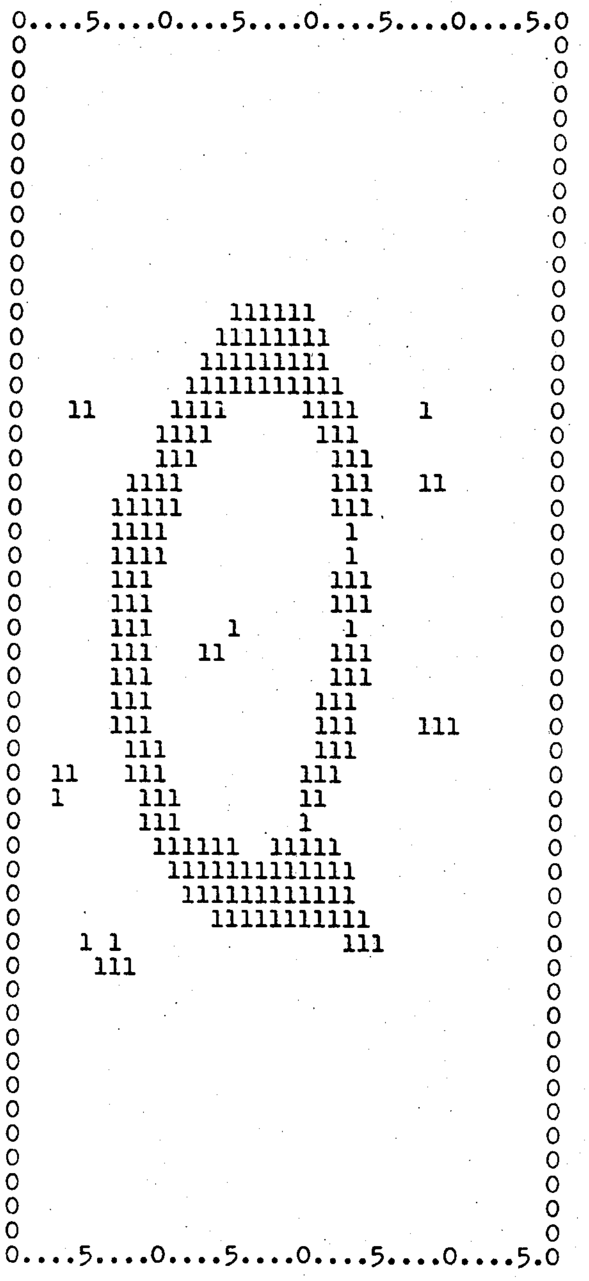
Figure 10:
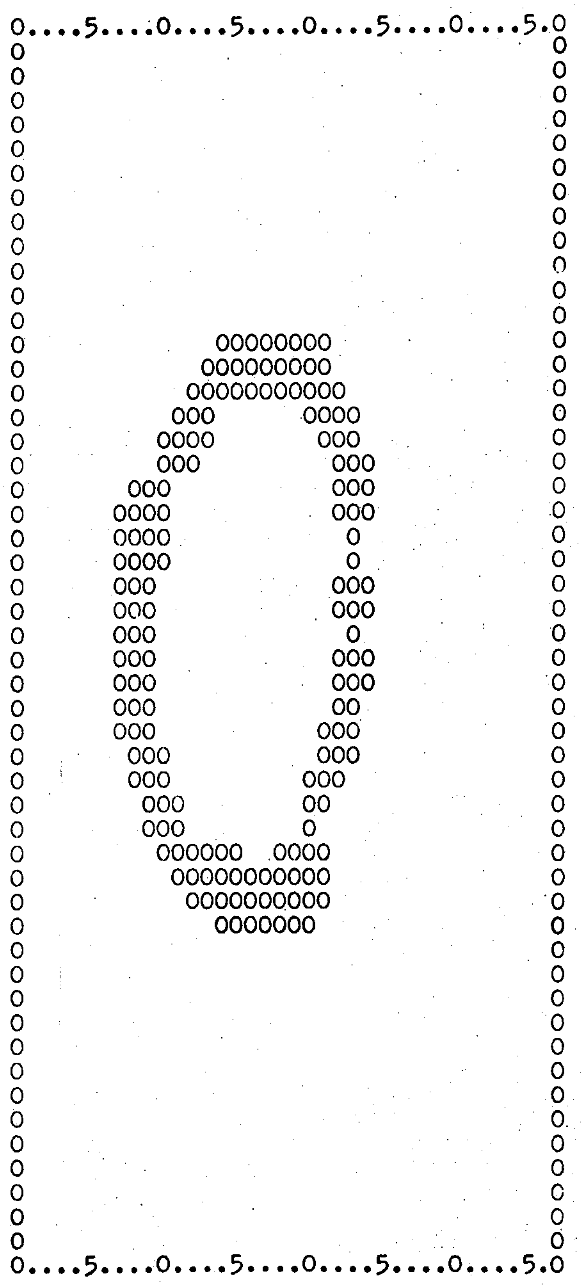
Figure 11:
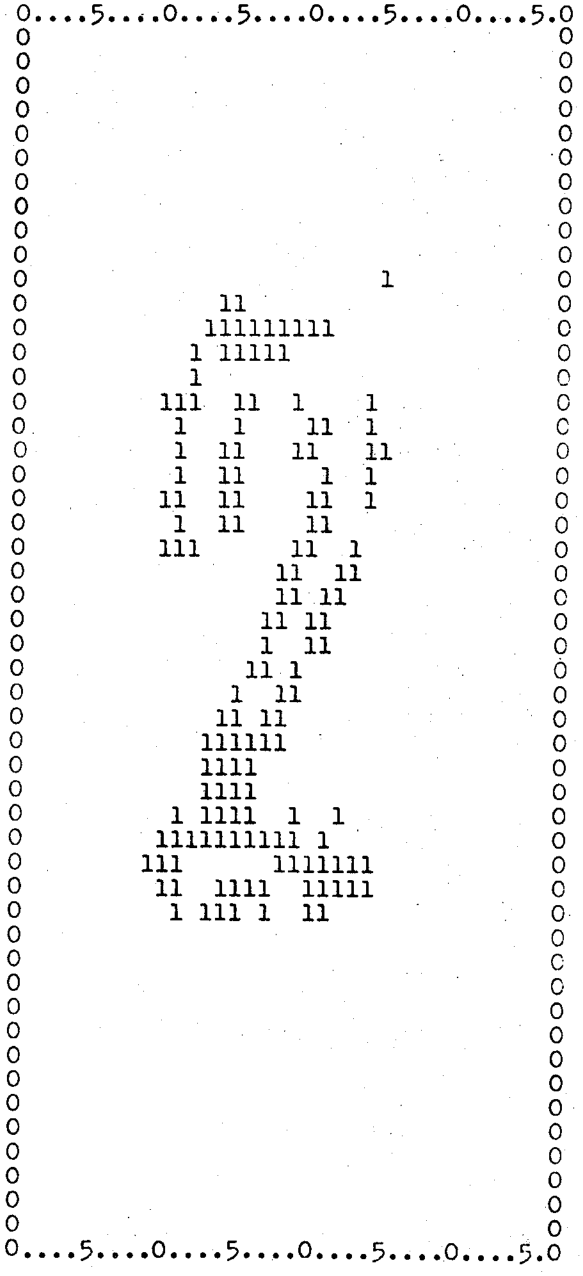
Figure 12:
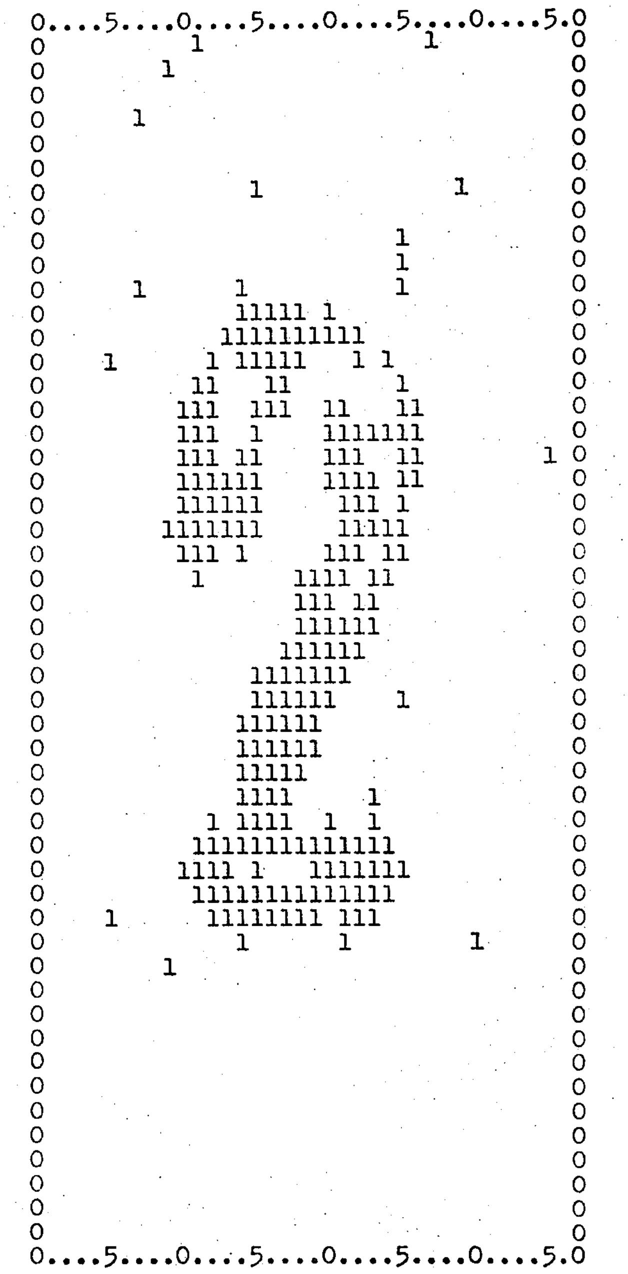
Figure 13:
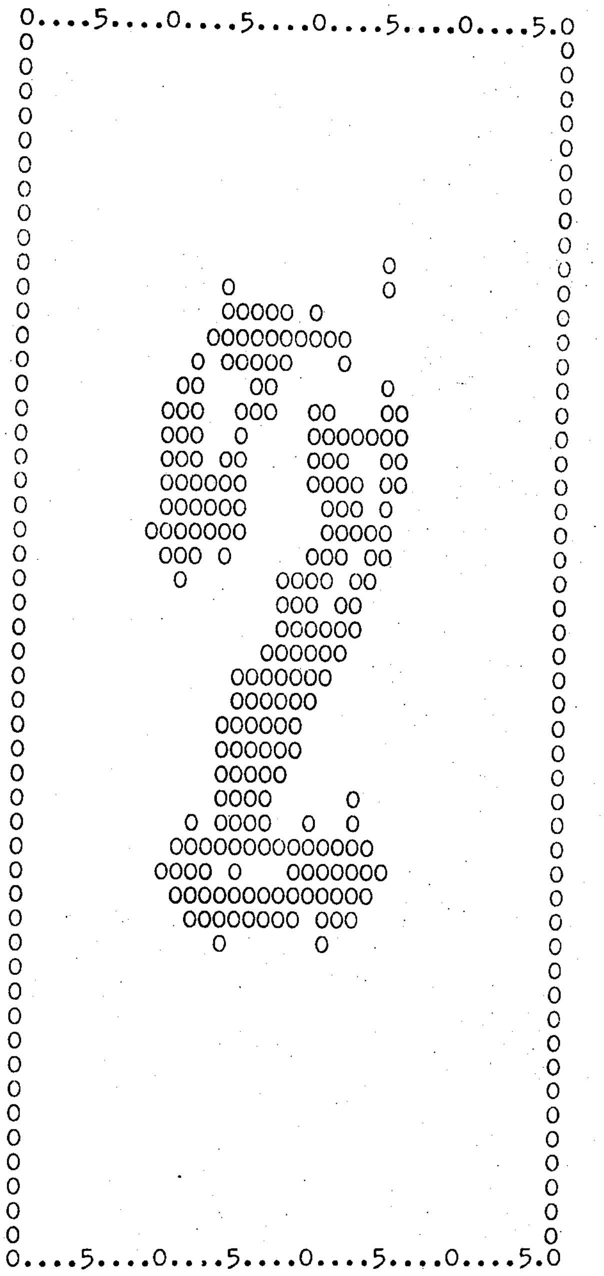
Figure 14:
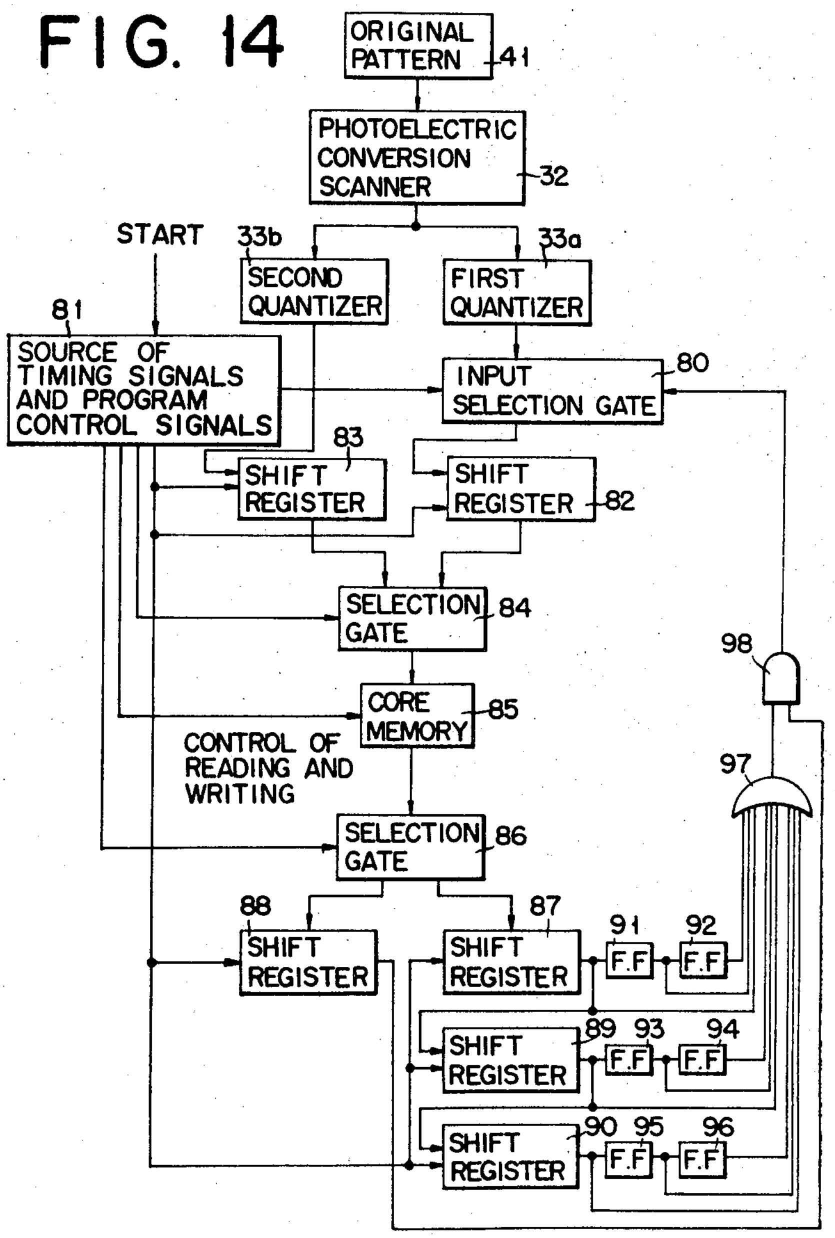
Figure 16:
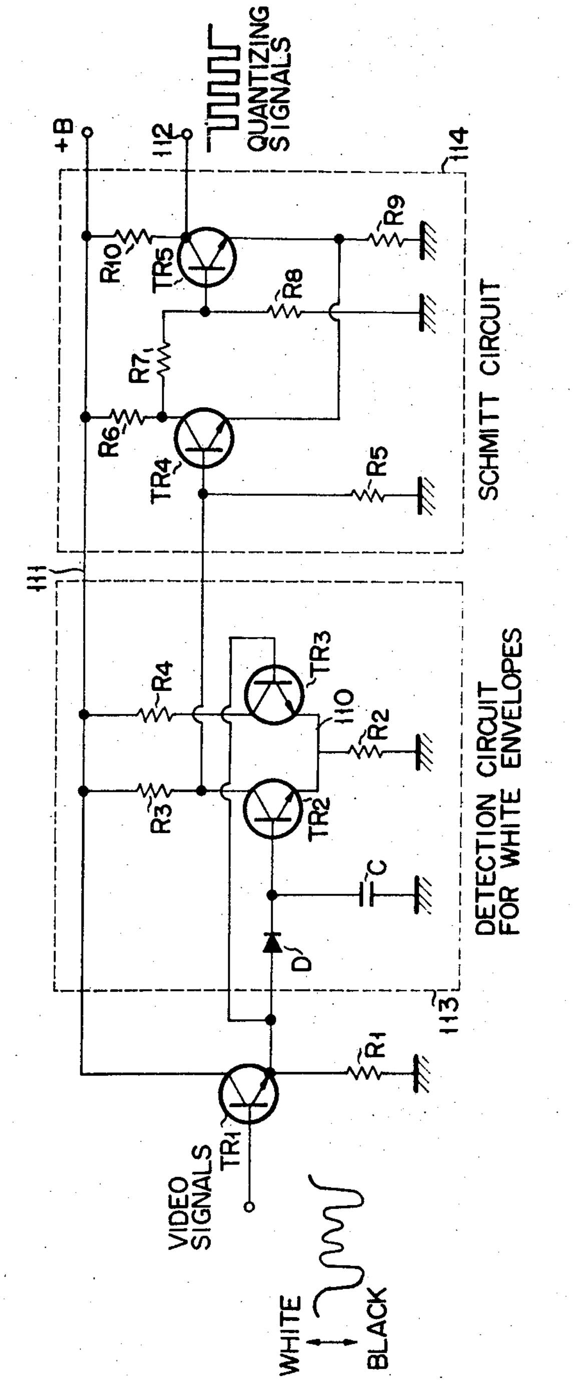

FIG. 4B indicates the concrete wave forms of video signals obtained by scanning part of said original character pattern by a photoelectric scanner;

FIG. 5A shows a reproduced character pattern corresponding to the first quantizer shown in FIG. 3;

FIG. 5B exhibits a reproduced letter pattern corresponding to the second quantizer of FIG. 3;

FIG. 6 is a schematic logic circuit constituting part of the pattern processing circuit of FIG. 3;

FIG. 7 represents a schematic block diagram of a preprocessing device for reading patterns according to another embodiment of the invention;

FIG. 8 displays a reproduced character pattern corresponding to the first quantizer of FIG. 7;

FIG. 9 shows a reproduced character pattern corresponding to the second quantizer of FIG. 7;

FIG. 10 illustrates a relay pattern obtained as an output from the relay pattern detector of FIG. 7;

FIGS. 11, 12 and 13 represent other patterns corresponding to FIGS. 8, 9 and 10 respectively;

FIG. 14 is a logic circuitry showing in greater detail the respective sections of the circuitry of FIG. 7;

FIG. 15 is a logic circuit showing in greater detail the input selection gate of FIG. 14; and FIG. 16 represents a practical circuit arrangement adapted for use as the first and second quantizers of FIGS. 3 and 7.

There will now be described by reference to the appended drawings a preprocessing device for reading patterns according to the preferred embodiments of the present invention. FIG. 3 is a schematic diagram of one of said embodiments. It is understood that the characters to be read out using the preprocessing device of the present invention include the alphabet, numerals, Japanese characters and marks. Now let it be assumed that an original character pattern to be read out consists of a black numeral "8" 42 recorded, as shown in FIG. 4A, by mechanical or hand printing or hand writing on the predetermined part of the surface of a record carrier 41 made of white paper (though papers of any color may be used). The surface of the record carrier 41 bearing said original character pattern 42 representing the numeral "8" may be divided into a plurality of optically scanned points arranged in the lengthwise and crosswise directions Y and X respectively. The surface of record carrier 41 bearing the character "8" denoted by reference 42 is scanned by a photoelectric conversion scanner 32 consisting of a flying-spot scanner or ordinary television camera through, for example, an objective lens 31 under control of outputs from a scanning control circuit 37. As the result of this operation, there are obtained from the scanner 32 video signals V*d* having a wave form shown in FIG. 4B which shows voltage levels corresponding to the value (black has a maximum density and white has a minimum density) on the surface of the record carrier 41 indicating the original character pattern 42. In carrying out the present invention, the video signals V*d* from said scanner 32 are supplied to a first quantizer **33*a* for carrying out quantization to obtain, for example, the "1" and "0" digits of a binary logic (with "1" taken as representing black portions having a density greater than a certain specified degree and "0" as denoting all other portions having a density smaller than said specified value) quantized at a first threshold voltage level, for example, the level A shown in FIG. 4B, such that the body 42 of a character to be read out may present omissions but there is not included any substantial readout signal component corresponding to original stains 44 (FIG. 4A) (hereinafter referred to as "paper noises") appearing in the spaces 43 of the record carrier 41 other than those occupied by the original character 42 and also to a second quantizer 33*b* for conducting quantization at a second threshold voltage level, for example the level B shown in FIG. 4B, such that the body of the original character 42 does not present substantially omissions, though there may be included a readout signal component corresponding to the paper noises 44 appearing in the spaces 43 of said record carrier 42 other than those occupied by the original character 41. In this case, it is desired that said first and second threshold voltage levels A and B be defined with reference to the voltage level C of FIG. 4B corresponding to the blank spaces 43 of said record carrier 41. The quantized outputs from the first and second quantizers 33*a* and 33*b* are respectively supplied to first and second registers 34*a* and 34*b* which are respectively arranged according to the two-dimensional scanning sequence of said scanner 32, and are temporarily stored therein. These registers 34*a* and 34*b* may be formed by arranging two-dimensionally, that is, lengthwise and crosswise digital memory elements, each consisting of for example, an ordinary bistable flip-flop circuit, core memory or relay memory, to the same number as that of the divided scanning points defined on the letter-indicating surface of record carrier 41 by the scanning process. With such arrangement, when all the surface of said record carrier 41 indicating the original character 42 to be read out has been fully scanned by said scanner 32, then there are stored in those elements of the two-dimensional assembly of first register 34*a* which correspond to the one-frame scanning period of television scanning quantized signals corresponding to a character pattern P, as shown in, for example, FIG. 5A, which do not contain readout signal components corresponding to spaces of said record carrier 41 other than those occupied by the original character 42, though said first mentioned quantized signals may contain signal components which represent omissions 51 in those portions of the original character 42** having a low density which corresponds to a voltage level lower than said first threshold voltage level A. At the same time, corresponding elements of the two-dimensional assembly of second register 34*b* are stored with quantized signals, as shown, in for example, FIG. 5B, corresponding to a character pattern Q which represent the body of the original character 42 with substantially no omissions, though the quantized signals may contain readout signal components corresponding to original paper noises 44 or reproduced paper noises 52 having a relatively high density which correspond to a higher voltage level than said second threshold voltage level B.

After being fully stored in said first and second registers 34*a* and 34*b*, the quantized signals corresponding to the one-frame period are supplied to the later described pattern processing circuit 35. Based on the first quantized signals from said first registers 34*a* which contain such signal components as will represent the original character 42 with the aforesaid omissions 51, said pattern processing circuit 35 causes those portions of said basic quantized signals which correspond to the omissions 51 to be filled up (or completer) by those portions of the second quantized signals from the second registers 34*b* which do not represent the original character 42 as containing omissions 51, thereby reproducing a character pattern substantially free from omissions in truthful relationship to the original pattern and at the same time eliminating those portions of the quantized signals which correspond to paper noises 52 other than the original character 42.

FIG. 6 is a schematic logic circuit constituting part of a pattern processing circuit displaying the aforementioned action. Now let it be assumed that the first and second registers 34*a* and 34*b* consist of a plurality of bistable flip-flop circuits 341*a* and 341*b* arranged lengthwise and cross-wise, that is, in a matrix form, that there are obtained from the output terminals on the "1" side of the respective flip-flop circuits quantized signal components corresponding to a higher voltage level than the respective threshold voltage levels A and B associated with the first and second quantizers 33*a* and 33*b* corresponding to the first and second registers 34*a* and 34*b*. Further with that part of the aforesaid matrix assembly which corresponds to each scanned point designated as an address, then each address contains an OR gate 61 and AND gate 62.

With an address at a given point designated as $(x, y)$, each of the OR gates 61 is supplied with signals from the output terminals on the "1" side of the bistable flip-flop circuits 341*a* constituting the address $(x, y)$ of the first register 34*a* in which said OR gate 61 is disposed and also signals from the output terminals of the AND gates 62 positioned in the addresses $(x+1, y)$, $(x-1, y)$, $(x, y+1)$ and $(x, y-1)$ which are displaced one address horizontally and vertically respectively from the first mentioned address $(x, y)$. Each of the AND gates 62 is supplied with signals from the output terminal of the OR gate 61 of the address $(x, y)$ in which said AND gate 62 is positioned and also signals from the output terminals on the "1" side of the flip-flop circuits 341*b* at that address.

The output terminals of the AND gates 62 are connected to a third register 36 having the same arrangement as the first and second registers 34*a* and 34*b*. There will now be described the operation of a pattern processing circuit 351 arranged as described above. As apparent from the manner in which the threshold voltage levels of the first and second quantizers 33*a* and 33*b* are defined, when the flip-flop circuit 341*a* of the first register 34*a* is supplied with "1" outputs, then the flip-flop circuit 341*b* of the second register 34*b* never fails to be similarly supplied with "1" outputs. In this case the AND gate 62 is sure to be actuated and to supply its output to the third register 36.

On the other hand, when the flip-flop circuit 341*b* of the second register 34*b* is supplying a "1" output, whereas the flip-flop circuit 341*a* of the first register 34*a* is not supplying any output, then the AND gate 62 is actuated only when the AND gates disposed in the addresses adjacent to that of these flip-flop circuits 341*a* and 341*b* are supplying "1" outputs, outputs from said AND gate 62 being conducted to the third register 36. Specifically, an output is obtained from the AND gate 62 only when the addresses adjacent thereto are judged to contain information on an original character body. In other words, in the case when a given flip-flop circuit 341*b* provides a "1" output, other similar flip-flop circuits 341*b* adjacent thereto are checked for the presence of "1" outputs, and the flip-flop circuits 341*a* positioned in the addresses corresponding to said other flip-flop circuits 341*b* are found to contain "1" outputs, then this event is deemed to represent the presence of the original character body. If no adjacent store in the second register contains a "1," an absence of the original character body is assumed. Thus the AND gate 62 is operated in such a manner that when the address associated therewith is considered to include a "1" output representing the original character body, then the AND gate 62 supplies such outputs to the other addresses adjacent to the first mentioned address, and when the absence of the original letter body, said AND gate 62 does not supply any output to those other addresses. Accordingly, the pattern forming operation in each of all the addresses is carried out simultaneously or instantly in parallel. Accordingly, it will be apparent that the original character body 42 is reproduced substantially without any omission, and any paper noise 44 present in the blank spaces 43 of a record carrier 41 is eliminated. The foregoing embodiment uses only those addresses which are displaced one bit vertically and horizontally from an address $(x, y)$ at a given point on the matrix in filling up those portions of the information stored in the first register 34*a* which correspond to "0" adjacent to "1." However, it will be apparent that other addresses displaced more than one bit vertically and horizontally, as well as in a slantwise direction thereof from said given address $(x, y)$ may be similarly used to this end, and any number of such adjacent addresses, whether displaced crosswise or slantwise, may be used.

Further, the memory capacity of the pattern processing circuit does not necessarily cover the entire surface of the record carrier 42 indicating an original character pattern. It will be apparent that said memory capacity may represent, for example, information only on a given crosswise or lengthwise row of said surface.

If the information stored in the pattern processing circuit 35, processed as above described, is temporarily stored in a third register 36 constructed in the same manner as the first and second registers and the information stored therein is read out where required, then the possibility of erroneous reading will be far more decreased than has been possible with the prior art.

FIG. 7 represents a schematic block diagram of a preprocessing device for reading patterns according to another embodiment of the present invention. This embodiment employs the same type of record carrier 41 and the same process as in the preceding embodiment of supplying video signals obtained by scanning the original character pattern $f(x, y)$ 42 which is recorded in said record carrier 41 by a photoelectric conversion scanner 32 (not shown in FIG. 7) to two quantizers 33*a* and 33*b* having different threshold voltage levels, thereby forming quantized signals consisting of "1" and "0" digits of a binary logic, so that the same parts are denoted by the same numerals and description thereof is omitted.

For convenience of description of the embodiment shown in FIG. 7, quantized signals from the first quantizer 33*a* are referred to as a first quantized pattern and designated as $f(x, y, \theta_1)$. Then said signals may be expressed by the following equation:

$$f(x, y, \theta_1) = 1\,[F(x, y) - \theta_1] \qquad (1)$$

where:

$$1\,[x] = \text{unit step function}$$

namely, $$1\,[x] = 1, x \geq 0$$
$$0, x < 0$$

$\theta_1$ = voltage level of quantization conducted by the first quantizer 33*a* (corresponding to the first threshold voltage level A used in the preceding embodiment).

As apparent from the foregoing description, an original character pattern reproduced by the first quantized pattern $f(x, y, \theta_1)$ contains many omissions and thinned out portions in its body, and has an appreciably great possibility of being erroneously read out, or failing to be read out.

By the same token, quantized signals from the second quantizer 33*b* are referred to as a second quantized pattern and denoted as $f(x, y, \theta_2)$. Thus there results the following equation:

$$f(x, y, \theta_2) = 1\,[F(x, y) - \theta_2] \qquad (2)$$

Where:

$\theta_2$ = voltage level of quantization conducted by the second quantizer 33*b* (corresponding to the second threshold voltage level B used in the preceding embodiment).

As seen from the above description, an original character pattern reproduced by the second quantizer does not present omissions and thinned out portions, but tends to allow original paper noises to be also read out as "1," so that it is very likely to be erroneously read out, or failing to be read out. The first quantized pattern is supplied to a device 71 for forming fuzzy or thickened pattern, and the second quantized pattern to a logic product pattern forming device 72. The first quantized pattern contains many omissions and thinned out portions, which have to be first filled up. To this end, there is conducted the following blurred pattern filling up operation. This operation may be made isotropically (or anisotropically) so as uniformly to fill up fine omissions or blanks. The typical first quantized pattern forming operation is conducted in the manner represented by the following equations:

i. If $f(x, y, \theta_1) = 1$
$f(x \pm i, y \pm j, \theta_1) = 1$ ii. If $f(x\, y, \theta_1) = 0$
$f(x \pm i, y\, 35\, j, \theta_1)$ = no change Where: $i$ and $j = 1, 2 \ldots n$.

The aforementioned operation physically means that if an address $(x, y)$ at a given point on the matrix contains information corresponding to the "1" of a binary logic, then there are used other addresses displaced by $n$ bits vertically, and horizontally, as well as in a slantwise direction thereof from said given address in isotropically filling up the above-described blanks, obtaining a relatively thick character body containing isotropically filled up fuzzy portions. This pattern is referred to as a thickened pattern and designated as $g(x, y, \theta_1)$. As seen from the aforementioned fuzzy pattern forming operation, this pattern is obtained by filling up all alike not only the omissions and thinned out portions of a character body corresponding to 2*n* bits but also those portions of a record carrier adjacent to the character body which should originally remain blank. This thickened pattern is supplied to said logic product pattern forming device 72, which in turn produces a logic product pattern $h(x, y, \theta_1, \theta_2)$ from said thickened pattern $g(x, y, \theta_1)$ and second quantized pattern $f(x, y, \theta_2)$.

As described above, the thickened pattern is prepared by filling up the omissions and thinned out portions of an original character body by the operation filling up a uniform isotropical thickened point, so that said pattern most likely allows other portions of a record carrier which should be left blank to be unnecessarily filled up. It is required, therefore, to detect and eliminate such unnecessarily filled up portions. The second quantized pattern $f(x, y, \theta_2)$ is used as reference for said detection. The second quantized pattern $f(x, y, \theta_2)$ is prepared by determining the thinned out portions or poorly contrasted portions of a character body at a sufficiently reduced voltage level $\theta_2$ of quantization fully to draw out signals representing said portions. Accordingly, said second quantized pattern $f(x, y, \theta_2)$ had extremely few omissions and can be deemed to contain a fully amount of information (very minute signals) which the first quantized pattern has already lost during the quantization process. All over said second quantized pattern, however, are scattered paper noises representing stains present in an original record carrier.

In contrast, the thickened pattern is free from such paper noises. If, therefore, there is obtained, for example, the logic product of said thickened pattern and second quantized pattern, then it will be apparent that unnecessary paper noises scattered all over said second quantized pattern will be eliminated, thereby properly filling up the omissions and thinned out portions of an original character body which have a size of 2*n* bits max. The logic product pattern $h(x, y, \theta_1, \theta_2)$ may be expressed as follows:

$$h(x, y, \theta_1, \theta_2) = G(x, y, \theta_1) * f(x, y, \theta_2)$$

Where:

$*$ = logic product

In this case, the logic product operation is conducted all over the area $\Omega$ of both patterns. This pattern $h(x, y, \theta_1, \theta_2)$ is a relay pattern where omissions and thinned out portions having a maximum size of $2n$ bits are filled up. To obtain an optimum relay pattern, it is advisable to detect the extent of thickened points and set the voltage levels $\theta_1$ and $\theta_2$ of quantization at a most suitable value.

There will now be further described the embodiment of FIG. 7 on the assumption, for example, that the character recorded in a record carrier represents a numeral "0" and a binary quantized pattern of 36 × 50 bits is to be read out. FIG. 8 represents the pattern of a numeral "0" read out by the first quantizer 33a which bears characteristic thinned out portions. The part of a record carrier where said pattern appears is represented by a value of "1" and the other parts thereof by a value of "0." If this pattern is reproduced as it is, it is likely to be erroneously read out or failing to be read out due to the presence of thinned out portions. In contrast, FIG. 9 shows a quantized pattern reproduced by the second quantizer 33b where there are detected even the poorly contrasted portions. Though the pattern as a whole is free from thinned out portions, its line becomes thick, indicating that there are presumably included a fairly large number of paper noises.

When the filling up operation is conducted on the basis of these two input patterns, there is obtained a relay or connected pattern illustrated in FIG. 10 from a relay or connected pattern forming device 73 connected to a logic product pattern forming device 72. The extent of thickened points appearing at this time is one bit ($n = 1$). Namely, each of said thickened points has a size extending one bit vertically, and horizontally, as well as in a slantwise direction thereof from each address of "1" included in the output pattern from the first quantizer 33a. As apparent from FIG. 10 showing the relay pattern, omissions and thinned out portions extending two bits ($n = 1$) max. are properly filled up and unnecessary paper noises are eliminated. It will be apparent that the lines of said relay pattern increase in thickness up to three bits from the one bit thickness of the lines of the first quantized pattern, but are still narrower than those of the second quantized pattern and substantially free from such deformation as are present in the second quantized pattern.

Referring to the embodiment of FIG. 7, there will now be further described a character pattern which assumes a somewhat different form from those bearing the aforesaid omissions and thinned out portions, namely a character body, the central portion of which is left out blank. The material taken up for discussion is a record carrier indicating a numeral "2" printed in hectocarbon of poor quality. FIGS. 11, 12 and 13 respectively are the first quantized pattern, second quantized pattern and relay pattern of said numeral "2." (As in the preceding embodiment, the first and second quantized patterns are obtained at a high and a low threshold voltage level respectively.) As seen from FIG. 11 representing the first quantized pattern, the central part of the character body is prominently left out, possibly leading to erroneous reading. If, however, there is performed the aforementioned relay pattern operation with respect to such defective character pattern, there can be substantially filled up the central blank portion as shown in FIG. 13, minimizing the occurrences of erroneous reading, or failing to be read out.

FIG. 14 illustrates a logic circuitry showing in greater detail the respective sections of the circuitry of FIG. 7. An input selection gate 80 having the later described circuit arrangement is initially so set as to pass output quantized signals consisting of the "1" and "0" digits of a binary logic from the first quantizer 33a under control of the timing signals from a source 81 of timing signals and program control signals. Said output quantized signals are supplied to a first shift register 82 under control of program control signals acting as shift pulses from said source 81 which are generated synchronizingly with scanning by the scanner 32. At this time, output quantized signals from the second quantizer 33b similarly consisting of the "1" and "0" digits of a binary logic are directly supplied to a second shift register 83 under control of program control signals from said source 81. The information stored in the first and second registers 82 and 83 is introduced into the corresponding addresses of a core memory 85 arranged in a matrix form through a selection gate 84 similarly under control of program control signals from said source 81 so as to be stored in said core memory 85. When there is completed a pattern writing operation of one frame, then follows the aforementioned relay pattern forming operation. First and second quantized signals stored in said core memory 85 are read out according to a predetermined sequence through a selection gate 86 under control of program control signals from said source 81 and supplied to the corresponding third and fourth registers 87 and 88. These third and fourth registers 87 and 88 start shifting and the output is generated in turn from the rear end thereof as scanning signals. In this case, said first quantized signals are allowed to pass through not only the third shift register 87 but also fifth and sixth registers 89 and 90. To the rear ends of said third, fifth and sixth registers 87, 89 and 90 are connected in cascade fashion three groups each comprising two flip-flop circuits as 91–92, 93–94 and 94–96, namely, so as to represent two one-bit portions, thereby generating first quantized signals corresponding to three bits per character line. Output signals from said third, fifth and sixth shift registers 87, 89 and 90 and flip-flop circuits 91 to 96 are supplied to an OR circuit 97. Accordingly, if all the aforesaid outputs themselves represent the "1" of a binary logic with respect to the central bit corresponding to the quantized signal from the first quantizer 33a or any of the addresses displaced one bit from said central bit constitutes "1," then the aforesaid OR circuit 97 considers this event to denote a character body itself and carries out the thickened pattern forming operation by generating the "1" output.

On the other hand, the second quantized signals from the core memory 85 pass through, for example, two shift registers 88 (only one of them is shown) synchronizingly with the first quantized signals under control of program control signals from the aforesaid source 81, thereby constituting outputs corresponding to two one-bit portions. Said outputs and those from the OR circuit 97 resulting from the thickened pattern forming operation are supplied to an AND circuit 98 to obtain a logic product. If, in this case, the addresses displaced one bit from a given address of an original character body quantized to "1" at a low threshold voltage level are quantized to "1" at a high threshold voltage level, then only there is read out the "1" of said character body. When there is completed a one frame reading operation with respect to the core memory 85, timing signals cease to be supplied from the source 81, so that the input selection gate 80 is instead supplied with output signals from the first quantizer 33a and switched so as selectively to pass one bit relay signals from the AND circuit 98. Thus output signals from the AND circuit 98 are supplied again to the core memory 85 through the input selection gate 80 and first shift register 82. If said output signals are subjected to the same processing operation to obtain a first quantized pattern there can be formed a relay pattern containing thickened points extending two bits max. It will be apparent that repetition of the same operation will obtain a desired number of relay patterns.

FIG. 15 illustrates a practical logic circuit 801 of the aforesaid input selection gate 80. There are provided two input AND gates 101 and 102. One input terminal of the AND gate 101 is connected to the output terminal of the first quantizer 33a and one input terminal of the AND gate 102 to the output terminal of the AND circuit 98. The other input terminal of the AND gate 101 is connected directly and the other input terminal of the AND gate 102 through a NOT gate 103 to the output terminal of timing pulses included in the source 81. Signals from the output terminals of both AND gates 101 and 102 are supplied to a common OR gate 104. It will be apparent that the input selection gate 801 thus arranged is capable of performing all the aforementioned actions described in connection therewith.

FIG. 16 shows a practical circuit arrangement suitable for use as the first and second quantizers 33a and 33b. Video signals from the scanner 32 are supplied to the base of an NPN-type emitter follower transistor $TR_1$. The emitter of said transistor $TR_1$ is connected to ground through a resistor $R_1$ and is connected to the base of one transistor $TR_3$ of a known differential amplifier 110 composed of two NPN-type common emitter coupled transistors $TR_2$ and $TR_3$, and also through a diode D of the indicated polarity to the base of the other transistor $TR_2$ having a bypass capacitor C connected. The emitters of the two transistors $TR_2$ and $TR_3$ are grounded through a common resistor $R_2$. Their collectors are connected to a D.C. source 111 through separate resistors $R_3$ and $R_4$. The collector of the transistor $TR_2$ is connected to the base of an NPN-type common emitter transistor $TR_4$ having a resistor $R_5$ connected between. The collector of the transistor $TR_4$ is connected through a resistor $R_6$ to the D.C. source 111, and is returned to ground through two serially connected resistors $R_7$ and $R_8$. The junction of these serially connected resistors $R_7$ and $R_8$ is connected to the base of an NPN-type common emitter transistor $TR_5$. The emitter of the transistor $TR_5$ is commoned with that of the transistor $TR_4$ and both are returned to ground in common through a resistor $R_9$. The collector of the transistor $TR_5$ is connected through a resistor $R_{10}$ to the D.C. source 111 and also to an output terminal 112 for the quantized signals.

In a quantizer having the aforementioned arrangement, when rectified output signals obtained by passing the video signals Vd through the diode D read out the blank surface of a record carrier, then if said surface bears a white color a blank level is used as the base, thereby obtaining at the junction of the diode and the capacitor the so-called white envelope signals based on said blank level. This section 113 of the quantizer is used as a circuit for detecting a white envelope. The difference between the scanning point and white envelope is obtained from the differential amplifier 110. The transistor $TR_4$ constitutes a so-called C-class amplifier, so that it is brought to an operative state only when the voltage level of output signals from the differential amplifier 110 rises higher than a certain specified threshold level on the basis of the blank level. If, therefore, the transistor $TR_4$ and transistor $TR_5$ cascade connected thereto are designed to form a saturated amplifier, then the aforesaid circuit section 114 acts as a so-called Schmitt circuit, generating signals with a rectangular wave form which corresponds to either of two values representing the cases where the transistor $TR_4$ is brought to an operative state and where it remains in an inoperative state. If, therefore, one of the two values is made to represent the "1" of a binary logic and the other the "0," then there will be realized the aforementioned quantization.

It will be noted that a quantizer used to this end may also consist of, for example, the circuit disclosed in "-PULSE AND DIGITAL CIRCUITS," McGraw Hill (1956) by Jacob Millman et al., pp. 164 to 172. Further, the Schmitt circuit may be substituted by another switching circuit, for example, a comparator.

What we claim is:

1. A preprocessing system for pattern recognition comprising a photoelectric conversion scanner for successively scanning elemental points on a surface of a record carrier bearing an original pattern consisting of characters to be read out, said scanner generating video signals corresponding to the original character pattern on the record carrier; a first quantizer connected to the output of said scanner for carrying out quantization for each of the elemental scanned points at a first threshold voltage level of the video signals from said scanner such that the signal representing a character may contain omitted portions, but does not include any substantial read out signal component corresponding to stains present in spaces of said record carrier other than those occupied by said characters; a second quantizer connected to the output of said scanner for carrying out quantization for each of the elemental scanned points at a second threshold voltage level of the video signals from said scanner such that the signal representing the character does not contain any substantial omissions, but may include read out signal components corresponding to stains present in spaces of said record carrier other than those occupied by said characters; a first storage register, connected to the output of said first quantizer, including a plurality of digital memory elements disposed in relationship corresponding to the elemental scanning points on the record carrier for storing output quantized signals from said first quantizer; a second storage register, connected to the output of said second quantizer, including a plurality of digital memory elements disposed in relationship corresponding to the elemental scanning points on the record carrier for storing output quantized signals from said second quantizer; a pattern signal generating device for generating thickened pattern signals which consist of output signals from the first register together with signals representing the elemental scanned points displaced at least one point vertically and horizontally from the elemental scanned point represented by the output signals from said first register; a logic product pattern forming device for obtaining the logic product of output signals from said thickened pattern forming device and output signals from said second register; and a connected pattern forming device for forming a complete connected pattern signal corresponding to the original character pattern by output signals from said logic product pattern forming device.

2. A preprocessing system for pattern recognition comprising a photoelectric conversion scanner for successively scanning elemental points on a surface of a record carrier bearing an original pattern consisting of characters to be read out, said scanner generating video signals corresponding to the original character pattern on the record carrier; a first quantizer connected to the output of said scanner for carrying out quantization for each of the elemental scanned points at a first threshold voltage level of the video signals from said scanner such that the signal representing a character may contain omitted portions, but does not include any substantial read out signal component corresponding to stains present in spaces of said record carrier other than those occupied by said characters; a second quantizer connected to the output of said scanner for carrying out quantization for each of the elemental scanned points at a second threshold voltage level of the video signals from said scanner such that the signal representing the character does not contain any substantial omissions, but may include read out signal components corresponding to stains present in spaces of said record carrier other than those occupied by said characters; a first storage register, connected to the output of said first quantizer, including a plurality of digital memory elements disposed in a relationship corresponding to the elemental scanning points on said record carrier for storing output quantized signals from said first quantizer; a second storage register, connected to the output of said second quantizer, including a plurality of digital memory elements disposed in a relationship corresponding to the elemental scanning points on said record carrier for storing output quantized signals from said second quantizer; and a pattern processing circuit connected to the outputs of said registers for producing a character pattern corresponding to the original scanned from said record carrier, which circuit comprises a plurality of OR and AND gates, said OR gates being disposed in a relationship corresponding to the elemental scanning points on said record carrier and having their inputs supplied with "1" outputs representing character elements on said record carrier and obtained both from that digital memory element of said first register which is provided with its own OR gate and also from AND gates displaced at least one point vertically and horizontally from that of the elemental scanned points which is provided with its own OR gate, said AND gates being disposed in a relationship corresponding to the elemental scanning points and having one input supplied with a "1" output representing a character element on said record carrier obtained from that digital memory element of said second register which corresponds to that of the elemental scanned points which is provided with its own AND gate and the other input supplied with an output signal from that of the OR gates which corresponds to that of the elemental scanned points which is provided with its own AND gate, thereby obtaining the output digital pattern of said AND gates as a character pattern desired to be read out.

* * * * *